Cramer & Blossom,
Saw Gummer;
Nº 9,440.          Patented Dec. 7, 1852.
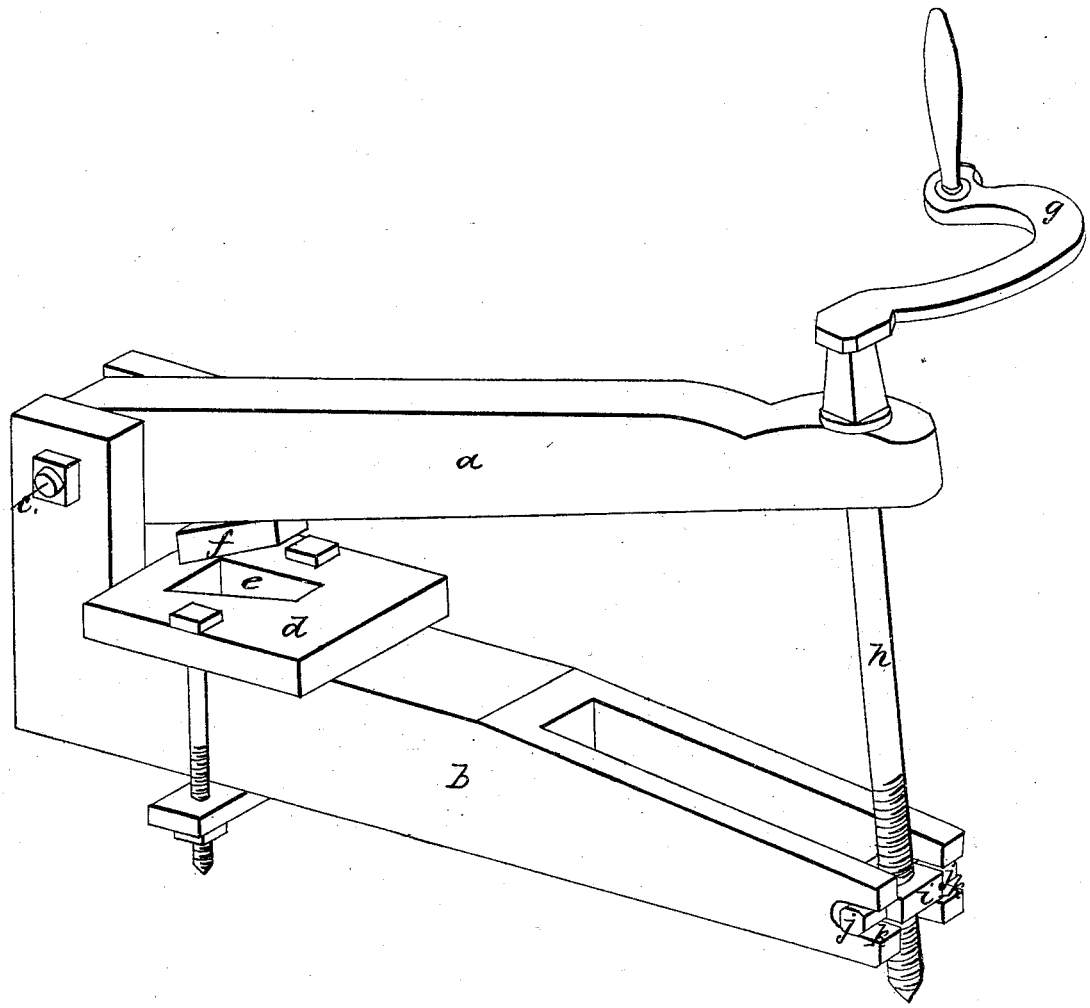

UNITED STATES PATENT OFFICE.

R. S. CRAMER AND C. C. BLOSSOM, OF SOMERVILLE, OHIO.

SAW-GUMMER.

Specification of Letters Patent No. 9,440, dated December 7, 1852.

*To all whom it may concern:*

Be it known that we, RICHARD S. CRAMER and CYRUS C. BLOSSOM, both of Somerville, in the county of Butler and State of Ohio, have invented new and useful Improvements in Apparatus for Gumming Mill-Saws; and we do hereby declare the following to be a full, clear, and exact description thereof, reference being had to the annexed drawing, making part of this specification.

The object of our invention is to provide a portable apparatus by means of which mill saws may be more advantageously gummed than by devices now in use.

In the annexed perspective view (*a, b,*) are two jaws, hinged to each other at (*c*). Bolted to the lower of these jaws (*b*) is a bed plate (*d*) having a socket (*e*) fitted to the cutter block or die (*f*) attached to the underside of the jaw (*a*).

(*g*) is a winch operating a screw bolt (*h*), which journaling within the end of the jaw (*a*), is tapped at its other end within a nut (*i*), whose gudgeons (*j*) occupy notches (*k*), in the end of the jaw (*b*). These notches (*k*) being open at one side, permit the apparatus to be placed around the saw blade, the nut being temporarily removed from the notches for that purpose; then the machine being so disposed that the cutting die shall come opposite to the part to be removed, the screw is then rotated so as to bring the jaws together and the die is thereby caused to remove the superfluous parts and push it through the aperture in the bed plate.

The advantages of this form of saw gummer over these heretofore employed having the fulcrum between the power and the cutting portion are of a very decided character. In the first place there is a saving of about one third of the material, for with the common gummer all beyond the fulcrum is in addition, besides which the jaws have to be as heavy on both sides of the fulcrum, at the distance of the punch, as with ours on one side, and at the fulcrum, still heavier. The usual machine is also inconveniently lengthy. Among the disadvantages attendant on this greater bulk is the unwieldiness arising partly from the great weight to be upheld while being operated and partly from the inconvenient distance of the work from the operator; this is chiefly objectionable on account of the liability to bend the teeth and the greater chance of inaccuracy in the process of gumming, this evil is increased by the fact that that part of the punch farthest from the fulcrum, which in both forms of gumming apparatus spoken of, gives the concluding and most difficult part of the cut, is in the common form at the greatest distance from the operator whereas in ours it is the nearest to him. Of course the labor of performing the operation and the cost of construction are greater with the heavier instrument.

What we claim therein as new and desire to secure by Letters Patent is—

The nut (*i*) having gudgeons (*j*) occupying open notches (*k*) in one of the jaws of a saw gumming apparatus, in which the cutting portion is situated between the power and the fulcrum for the objects explained.

In testimony whereof, we have hereunto set our hands before two subscribing witnesses.

RICHARD S. CRAMER.
CYRUS C. BLOSSOM.

Witnesses:
EDWARD H. KNIGHT,
GEO. H. KNIGHT.